United States Patent
Bellessort et al.

(10) Patent No.: US 9,195,522 B2
(45) Date of Patent: Nov. 24, 2015

(54) METHOD AND DEVICE FOR CONTROLLING COMMUNICATION BETWEEN APPLICATIONS IN A WEB RUNTIME ENVIRONMENT

(71) Applicant: CANON KABUSHIKI KAISHA, Tokyo (JP)

(72) Inventors: Romain Bellessort, Rennes (FR); Youenn Fablet, La Dominelais (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/020,587

(22) Filed: Sep. 6, 2013

(65) Prior Publication Data
US 2014/0075453 A1    Mar. 13, 2014

(30) Foreign Application Priority Data
Sep. 10, 2012    (EP) .................................... 12183759

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |

(52) U.S. Cl.
CPC . *G06F 9/54* (2013.01); *G06F 9/541* (2013.01)

(58) Field of Classification Search
CPC .................................. G06F 9/54; G06F 9/541
USPC .......................................................... 719/313
See application file for complete search history.

(56) References Cited

U.S. PATENT DOCUMENTS

| | | | |
|---|---|---|---|
| 2009/0144392 A1* | 6/2009 | Wang et al. | 709/217 |
| 2012/0324568 A1* | 12/2012 | Wyatt et al. | 726/13 |

FOREIGN PATENT DOCUMENTS

WO    2009/016347 A1    2/2009

OTHER PUBLICATIONS

Developer.andoird.com, "Sending the user to another app", Aug. 15, 2013, retrieved from archive.org.*

* cited by examiner

*Primary Examiner* — Timothy A Mudrick
(74) *Attorney, Agent, or Firm* — Canon USA Inc IP Division

(57) ABSTRACT

The invention relates to a method for controlling communication between web applications in a web runtime environment such as a web browser. The method comprises the step of: executing code of a service provider application by the web runtime environment thereby providing a data object; obtaining a list of one or more service requester applications, each service requester application being adapted to generate a service request and implementing an interface for receiving a data object in response to the generated service request; enabling the selection, among the obtained list, of one or more requester applications adapted to receive data objects of the same type as the provided data object; and communicating the provided data object to the selected one or more requester applications via their corresponding interface. The invention also relates to a computer program and a processing device adapted to execute the method.

13 Claims, 8 Drawing Sheets

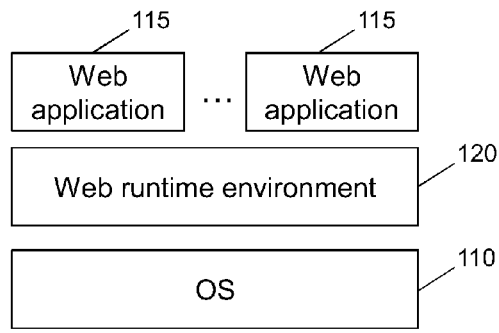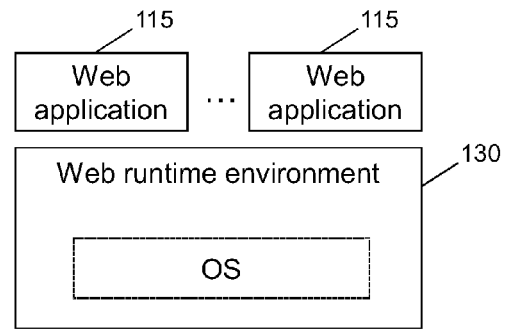
Fig. 1A    Fig. 1B
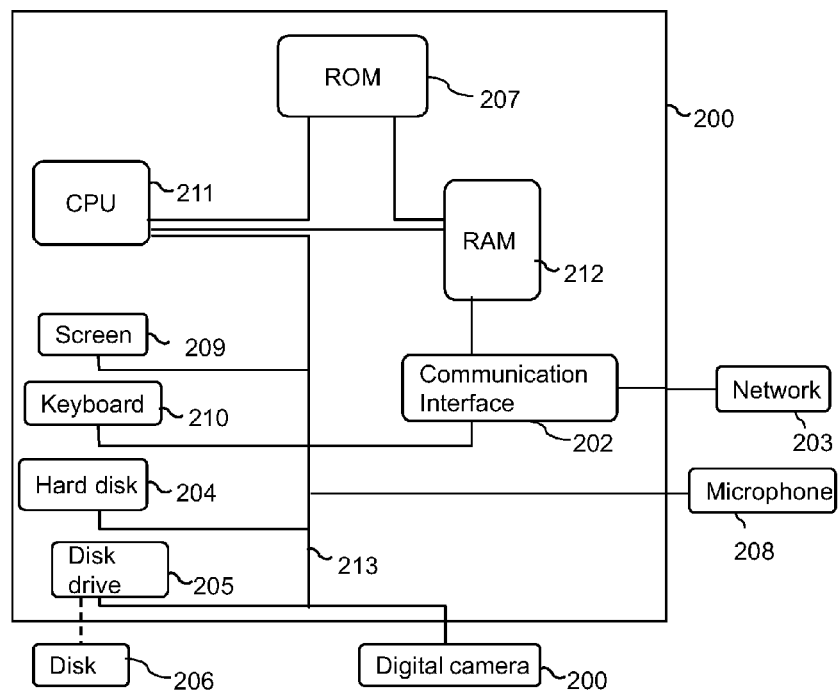
Fig. 2

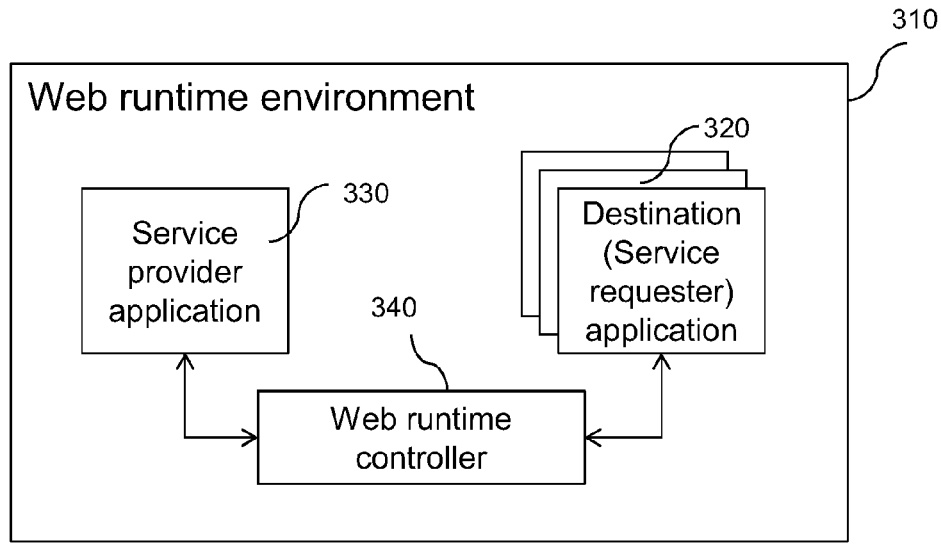

Fig. 3

```
function shareData(data, type) {
        var serviceRequest = new ServiceRequest({         404a
402a            "action": "share",         405a
                "type": type,
                "data": data});         403a
        navigator.generateServiceRequest(serviceRequest,
        406a            handleSuccess, handleFailure);
}
function handleSuccess(event) {         407a
        // Handle success event
}
function handleFailure(event) {         408a
        // Handle failure event
}
// This function is called e.g. by clicking on a button
function performSharing() {
            var data = getData();//this function gets data to share
401a    var type = "text";
            shareData(data, type);
}
```

Fig. 4A

```
function completeSharing() {
        var response = ...; // Response data           411b
        serviceRequest.postResult(response);          412b
}
```

Fig. 4B

```
function shareData(data, type) {
        var intent = new Intent({
                        "action": "http://webintents.org/share",
                        "type": type,
                        "data": data});
        navigator.startActivity(intent, handleSuccess, handleFailure);
}
function handleSuccess(event) {
        // Handle success event
}
function handleFailure(event) {
        // Handle failure event
}
// This function is called e.g. by clicking on a button
function performSharing() {
        var data = getData();//this function gets data to share
        var type = "text";
        shareData(data, type);
}
```

Fig. 4C

```
function completeSharing() {
        var response = ...; // Response data
        window.intent.postResult(response);
}
```

Fig. 4D

METHOD AND DEVICE FOR CONTROLLING COMMUNICATION BETWEEN APPLICATIONS IN A WEB RUNTIME ENVIRONMENT

CROSS-REFERENCE TO RELATED APPLICATIONS

This application claims the benefit under 35 U.S.C. §119 (a)-(d) of European Patent Application No. 12183759, filed on Sep. 10, 2012 and entitled "method and device for controlling communication between applications in a web runtime environment".

The above cited patent application is incorporated herein by reference in its entirety.

BACKGROUND OF THE INVENTION

This invention relates to the field of web services, and more particularly to the communication of data objects between applications in a web runtime environment such as a web browser.

Providing services over the web such as sharing of contents is becoming widespread as the number of web enabled devices is increasing significantly. Although services available over the web rely mostly on the client/server model where a client web application exchanges data with a web server, increasingly client web applications need to pass data between each other when running on a same client device. This is aimed to enhance the provided service and user experience.

In this context, it is known to have a service requester web application run by a web browser making a service request towards another web application hosted by the same web browser and capable of providing the requested service. For instance, a photo album application may request photos ("pick" service) from another application adapted to provide photos. This model doesn't provide however the necessary flexibility for coping with all the emerging usage scenarios, while maintaining the applications dissociated.

It is therefore sought to improve the way web applications can exchange data while maintaining a loose coupling between them and keeping an open architecture that makes it possible to plug-in applications form different developers.

SUMMARY OF THE INVENTION

The present invention in its first aspect provides a method for controlling communication between applications in a web runtime environment as specified in claims 1 to 10.

The present invention in its second aspect provides a processing device adapted to run a web runtime environment for controlling communication between applications as specified in claim 11.

The present invention in its fourth aspect provides a computer-readable storage medium as specified in claim 12.

The present invention in its fifth aspect provides a method for controlling communication between applications in a web runtime environment as specified in claim 13.

Further features of the present invention will become apparent from the following description of embodiments with reference to the attached drawings.

BRIEF DESCRIPTION OF THE DRAWINGS

FIG. 1A illustrates a web runtime environment run by the operating system of a processing device.

FIG. 1B illustrates a variant web runtime environment consisting of an operating system enabled to run directly web applications.

FIG. 2 schematically illustrates a processing device configured to implement a web runtime environment according to at least one embodiment of the present invention.

FIG. 3 schematically illustrates an architecture model of the web runtime environment according to embodiments of the invention.

FIG. 4A shows an excerpt of JavaScript code of a service requester application adapted to request a "Share" service.

FIG. 4B shows an excerpt of JavaScript code of a service provider application adapted to provide a "Share" service.

FIGS. 4C and 4D present alternative implementation, respectively to FIGS. 4A and 4B, using Web Intents syntax as defined by W3C.

DETAILED DESCRIPTION OF THE INVENTION

Figure 5:
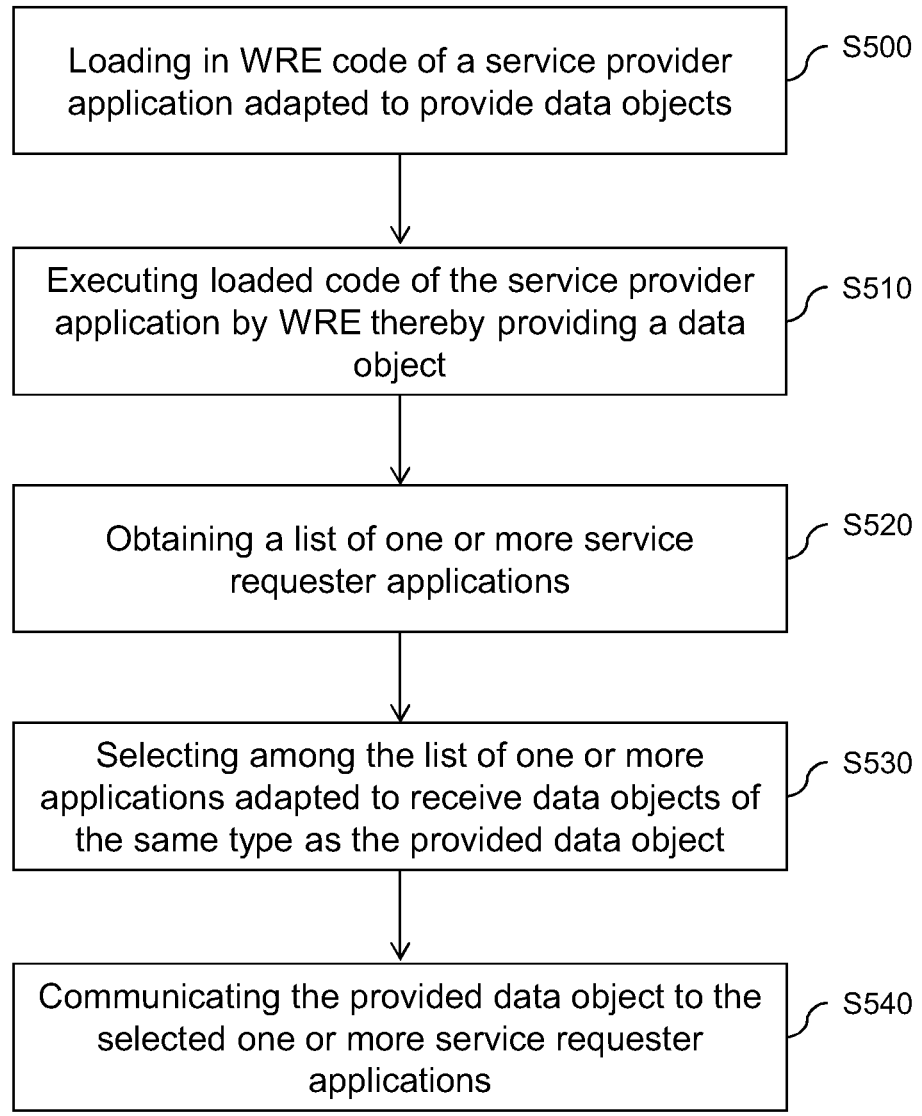
FIG. 5 is a flowchart that describes the process of handling service requests generated by a service requester application according to an embodiment of the invention.

FIGS. 1A and 1B illustrate a web runtime environment (WRE) in accordance with embodiments of the present invention. A web runtime environment is an environment able to run the code of web applications, by parsing and executing the instructions contained therein. Code instructions are typically written in HTML (Hypertext Markup Language) and JavaScript.

FIG. 1A illustrates a web runtime environment (WRE) 120 which is run by the operating system 110 of a processing device such as a computer device. The WRE retrieves the code of web applications 115, for instance by loading the applications from URLs (Uniform Resource Locators), and runs the corresponding code instructions. Web applications 115 may represent distinct applications or several instances of an application, i.e. the same code loaded and executed several times. Unless otherwise stated, when reference is made in the following to different applications, these applications may be distinct applications, several instances of one application or several instances of distinct applications.

An end-user web browser is an example of a web runtime environment according to FIG. 1A which enables running web applications by inputting URLs.

FIG. 1B illustrates a variant web runtime environment 130 consisting of an operating system enabled to run directly web applications. In this case, instead of being loaded in a web browser, the application is run by the operating system using for example a specific command and rendered in a dedicated window. An example of such operating system is Firefox OS.

In either implementation of the WRE, it is to be noted that web applications loaded by the WRE may be retrieved from a server or a storage unit located in the same processing device as the device hosting the WRE, or located in a remote device connected to the processing device through a communication network. The remote device can be located in the same local area network as the processing device or in a distant network.

Alternatively, web applications retrieved by the WRE may be natively installed on the processing device. This is for example the case for Firefox OS, whose applications are written for example in HTML version 5.

Thus, the web runtime environment should be understood as a software application adapted to run web applications obtainable from different sources such as Intranet, Internet or as a standalone software application running web applications natively installed. In either case, the WRE is purely a client-side application, distinct from the web servers it may interact with for downloading applications.

Embodiments of the invention described here below are considered to be implemented by a web runtime environment as illustrated by any one of the FIGS. 1A and 1B.

FIG. 2 schematically illustrates a processing device 200 configured to implement a web runtime environment according to at least one embodiment of the present invention. The processing device 200 may be a device such as a computer, a micro-computer, a workstation or a light portable device, e.g. a smartphone. The device 200 comprises a communication bus 213 to which there are preferably connected:

a central processing unit 211, such as a microprocessor, denoted CPU;

a read only memory 207, denoted ROM, for storing computer programs for running the operating system of the processing device and the WRE;

a random access memory 212, denoted RAM, for storing the executable code of the methods of embodiments of the invention; and a screen 209 for rendering loaded web applications (web pages) and/or serving as a graphical interface for inputting data from the user, by means of a keyboard 210 or any other means (e.g. touchscreen).

Optionally, the apparatus 200 may also include the following components:

a communication interface 202 connected to a communication network 203 over which digital data is exchanged with other processing devices, e.g. a remote server or a storage unit.

a non-volatile data storage means 204 such as a hard disk, for storing computer programs for implementing methods of one or more embodiments of the invention and data used or produced during the implementation of one or more embodiments of the invention; and a disk drive 205 for a disk 206, the disk drive being adapted to read data from the disk 206 or to write data onto said disk;

The apparatus 200 can be connected to various peripherals, such as for example a digital camera 200 or a microphone 208, each being connected to an input/output card (not shown) so as to supply multimedia data to the apparatus 200.

The communication bus provides communication and interoperability between the various elements included in the apparatus 200 or connected to it. The representation of the bus is not limiting and in particular the central processing unit is operable to communicate instructions to any element of the apparatus 200 directly or by means of another element of the apparatus 200.

The disk 206 can be replaced by any information storage medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the methods according to the invention to be implemented.

The executable code may be stored either in read only memory 207, on the hard disk 204 or on a removable digital medium such as for example a disk 206 as described previously. According to a variant, the executable code of the programs can be received by means of the communication network 203, via the interface 202, in order to be stored in one of the storage means of the apparatus 200, such as the hard disk 204, before being executed.

The central processing unit 211 is adapted to control and direct the execution of the instructions or portions of software code of the program or programs according to embodiments of the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

FIG. 3 schematically illustrates an architecture model of the WRE according to embodiments of the invention. As illustrated, the WRE enables different applications, or instances thereof, to communicate with each other within the device hosting the WRE (without the involvement of a web server) under the control of a web runtime controller (or WRE controller) 340.

According to the model, the WRE controller 340, which is part of the web runtime environment 310, is in charge of controlling the communication between a service provider application (SPA) 330 and one or more destination applications 320.

The service provider application 330 is a web application loaded and run in the web runtime environment 310 according to the model of web applications 115 of FIG. 1A or 1B. The service provider application 330 is preferably coded using a combination of JavaScript and HTML.

The execution of the service provider application enables to provide different services (we can say also perform actions) on payload data (contents) such as "Share", "View", "Edit" and "Pick" services. In addition to the performed actions, the service provider application may be adapted to provide, during its execution by the WRE, data objects resulting from the execution of the service. For example, if the provided service is editing an image ("Edit" service), the provided data object would contain the edited image. It is to be noted that applications providing different services may still return a same type of data object; for example applications providing "Edit" and "Pick" services applied to an image payload would both return a same data object type containing the edited image and the picked image respectively. A provided data object can also be void or containing only status information on the execution of the associated service. For example, if the provided service is sharing an image ("Share" service), a void data object may be returned.

A data object provided by the provider application is passed to the controller for delivery to the destination application(s) 320.

Also, the service provider application may provide its service in response to the reception of a service request, via the controller, from a service requester application (SRA). A service requester application is an application adapted to generate a service request and which typically implements an interface for receiving a data object in response to the generated service request. It should be noted however that according to embodiments of the present invention, the destination application(s) 320 to which is directed a resulting data object may be distinct from the service requester application that made the request. This is described in more details later.

Practically, the service requester application generates a service request in the form of a request object and passes it to the controller or in the form of parameters passed to the controller which would then be in charge of generating the request object. The request object represents thus from an implementation point of view the means by which a service is requested by a service requester application. The request object may contain payload data needed by the provider application to provide the service. For example, "Edit" and "Share" services need payload data (e.g. images, text, etc.) that is to be edited and shared respectively. The request object may also contain the necessary information (methods) on how to interface to the service requester application. Details on the content of a request object and an example of code to generate the request object are provided later.

The destination applications 320 are applications loaded and run in the web runtime environment 310 according to the model of web applications 115 of FIG. 1A or 1B. A destination application is for example any web page (client web application) containing HTML and JavaScript code that can be loaded, parsed and rendered by a web browser representing the WRE. Each destination application is adapted to receive a data object provided by the service provider application 330.

According to embodiments of the invention, a destination application is a requester application. As discussed before, this means that not only the destination application is adapted to generate service requests but also that it implements an interface for receiving data objects in response to the generated service requests. Contrary to conventional methods where the generation of a service request by the requester application is essential to have the service provided by a service provider application and possibly getting a resulting data object in return, in embodiments of the present invention the service requester application is firstly and advantageously used as a destination application for which the type of accepted data objects and the interface via which those data objects are to be communicated are known. This communication model has surprisingly been found to be appropriate for addressing a variety of usage scenarios (cf. FIGS. 10A and 10B).

More details on the structure of a request object will now be given along with implementation examples given by FIGS. 4A to 4D of a service provider application and a service requester application compliant with the model of FIG. 3.

A request object is for example a JavaScript object created by a web client application acting as a service requester application. When the object is created, the client web application adds attributes (parameters) for defining the request, such as for example the requested service (e.g. "Share", "View", "Edit", ...), the payload data associated with the service (e.g. title and URL of an article to be shared, image to be edited, ...) and the type of payload data (e.g. "text", "image", "audio", ...).

Any other type of request object may alternatively be used. As an example, the request object can be a Web Intent object as defined by the World Wide Web Consortium (W3C) for modeling a particular task which can be requested to be handled by a web page or a web application.

The client web application may add also methods to the JavaScript object, referred to as call-back methods, defining the API of the web application. The methods can be called to provide the service requester application with returned data objects in case of success or failure of the execution of the requested service.

One role of the controller is to keep the service provider and service requester applications independent while maintaining the communication between them. This makes it possible to develop applications independently without rising compatibility issues and by increasing security. For that, call-back methods defined by the requester application are not made directly accessible by the service provider application for providing its resulting data object (i.e. the service requester application does not expose an API to the service provider application), but generic methods are added or linked to the request object to be communicated to the service provider application. On the WRE side, the controller maintains a correspondence between the generic methods and the call-back methods defined by the requester application and which are associated with the service request. For example, postResult( ) and postFailure( ) define generic methods to be used in case of, respectively, successful or unsuccessful processing of a request object. In operation, the provider application calls a generic method to give a data object to the controller, and the controller call in turn the corresponding call-back function to deliver the data object to the service requester application.

FIG. 4A shows an excerpt of JavaScript code of a service requester application adapted to request a "Share" service.

When a user clicks for example on a button displayed by the application, a function 401a "performSharing( )" is called and a request object 402a "serviceRequest" is created corresponding to a service request from the service requester application (here the variant where the service requester application passes only parameters to the controller for creating the request object is not illustrated). The created object contains the payload data to be shared 403a, the action (service) to be performed 404a and the type of the payload data 405a (here "text" by referring to the parameter "type" passed to "shareData" function). Additionally, two call-back functions (methods) "handleSuccess" 407a and "handleFailure" 408a are defined for handling successful or unsuccessful processing of a service request respectively. Then the request object "serviceRequest" containing all the above parameters is passed to the web browser (controller) by calling the "navigator.generateServiceRequest" function 406a.

FIG. 4B shows an excerpt of JavaScript code of a service provider application adapted to provide a "Share" service. Here a data object "response" 411b is initialized containing for example status information and is passed to the web browser (controller) by calling a generic method "postResult( )" 412b defined in the request object "serviceRequest" that was passed to the service provider application. When the controller receives the "response", it performs a call to the corresponding function "handleSuccess" 407a for passing the data object to the service requester application.

FIGS. 4C and 4D present alternative implementation, respectively to FIGS. 4A and 4B, using Web Intents syntax as defined by W3C.

It is to be noted that the destination application is not necessarily a web application and can be, in an alternate implementation, an application run outside the WRE by another runtime environment such as the operating system of device 200. In this implementation, the WRE provides an interface reachable by the destination application to enable said destination application to send service requests to the WRE controller; additionally, destination application has to declare to WRE an interface to receive data objects from said controller, this interface being possibly communicated by the destination application along with a service request. Once the service requester application has provided its service request to the WRE, WRE handles this request as it would handle one submitted from a web application run by the WRE. Also, the service provider application communicates a data object to the WRE directed to a destination application as if the destination application is a web application loaded and run by the WRE.

As an example, a requester application running outside the WRE is a photo editing application run by the operating system in the case of embodiment of FIG. 1A (i.e. the WRE distinct from the operating system). This application may have a "Pick from Web" button to pick a photo from a social network. The WRE provides an interface accessible to applications run by the operating system enabling them to transmit a request object. By using the interface, the photo editing application can transmit a service request for a photo. The WRE would then serve this service request as a request coming from a web application, typically by displaying a list of possible service provider application for "Pick" and then forwarding request to the selected service provider application.

According to an embodiment of the invention, the request object is made available to the service provider application by a Web runtime controller 340 through a request object queue. The implementation of request object queue advantageously makes it possible to select a same service provider application for serving several service requests. There is thus no need to create several instances of the service provider application if this latter has been selected for serving several service requests. Also, the queue gives the possibility to implement service provider applications capable of providing complex services taking several request objects as input.

FIG. 5 is a flowchart that describes the process of handling service requests generated by a service requester application according to an embodiment of the invention. The process is run in the Web runtime environment.

At step S500, code of a service provider application corresponding to application 330 of FIG. 3 is loaded. Typically, the loading comprises obtaining HTML and JavaScript code and referenced resources (images, etc.) from the URL associated with the service provider application.

The code is then executed by the WRE at step S510. During the execution, a data object is provided to the WRE controller. The execution may lead automatically to the providing of a data object if the application is dedicated to provide a data object of a specific type. Alternatively, the execution may lead to the display of a user interface that enables the user to select a data object to be provided. Implementation examples of this step are provided with reference to FIGS. 6 and 7.

At step S520, a list of one or more service requester applications is obtained, each service requester application of the list being a possible destination application. The service requester applications are adapted to generate a service request and each implementing an interface for receiving a data object in response to the generated service request as described earlier. When obtaining the list of service requester applications, it is determined for each application in the list the type of the data object it is adapted to receive and the interface through which it can receive that data object. An implementation variant of this step is described with reference to FIG. 8.

At step S530, one or more destination applications adapted to receive data objects of the same type as the provided data object are selected among the obtained list.

The provided data object is then communicated by the WRE to the selected one or more destination applications at step S540.

The service provider application 330 may be loaded in response to a user action registered by the user interface of the WRE, such as clicking on an icon representing the service provider application on screen 209, or because the WRE is set by the user to automatically load the service provider application at each start.

The service provider application 330 may also be loaded in response to the reception by the WRE of a service request requesting the execution of a service if the service provider application can provide that service. In this case, the WRE delivers a request object corresponding to the service request to the service provider application during loading (as initialization parameter) or after loading (via a dedicated interface), causing the service provider application to perform actions associated with the requested service, if any, and to provide the data object associated with the service. It is important to note that the service request that triggers the loading and execution of the service provider application is not necessarily generated by one of the selected service requester (destination) applications to which the resulting data object is to be provided. It could be a distinct service requester application which generates that service request (cf. example scenario of FIG. 10A). It could also be one of the selected requester applications but which has already been provided with a first data object in response to a previously generated service request. This may occur for example if the requester application has generated a service request at a first stage and has already received in response a first data object provided by the provider application, then, at a second stage, the provider application comes with a second data object and that requester application has been selected as candidate for receiving the second data object.

Figure 10A:
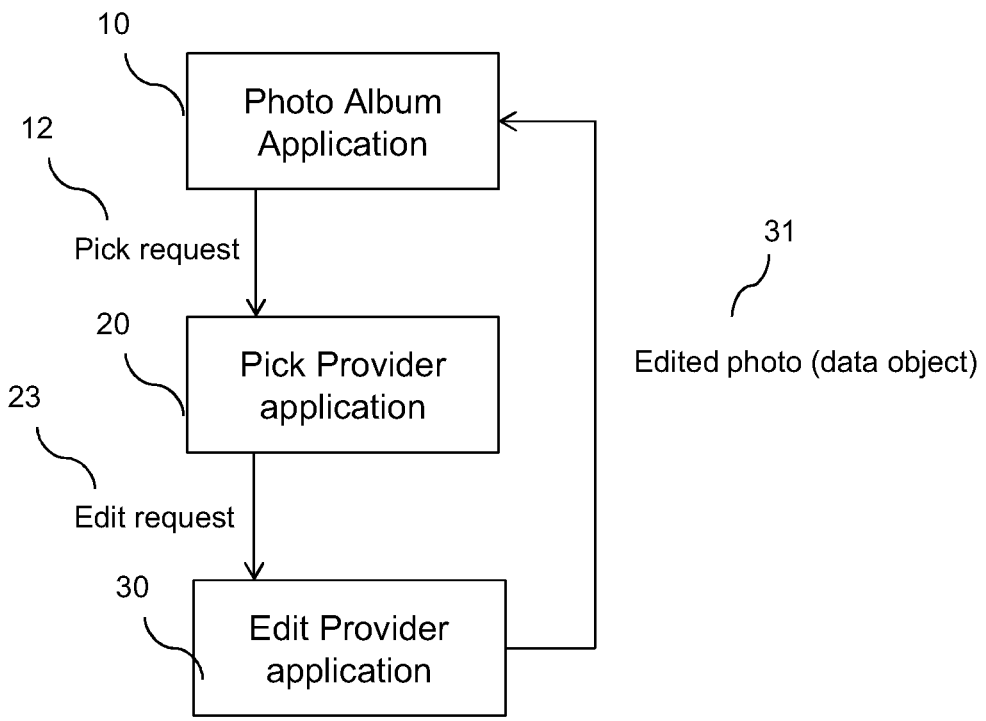
FIGS. 10A and 10B illustrate communication scenarios between applications controlled by the web runtime environment according to embodiments of the invention.
Figure 10B:
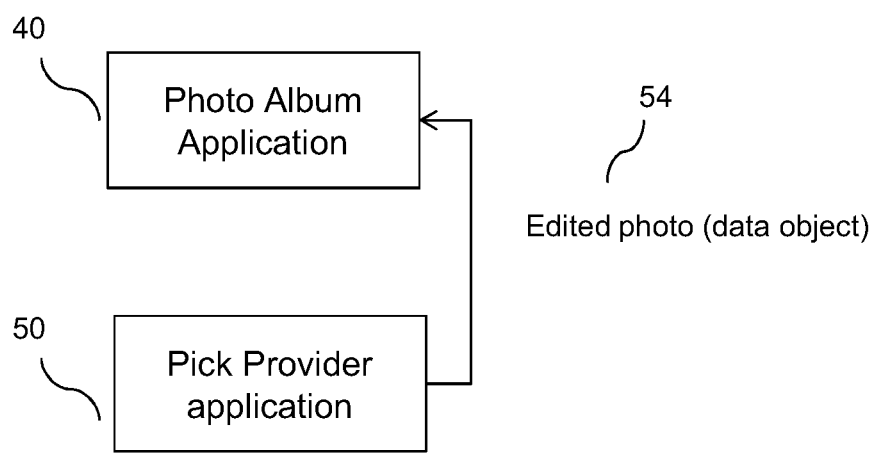

We can clearly see here that the invention in its different embodiments provides the necessary flexibility for handling a variety of communication scenarios between applications within a web runtime environment. In particular, it makes it possible to transmit a data object provided by a provider application to any application which is known to have an interface enabling it to receive such kind of objects. Whether or not a service request has been made by a service requester application has little impact on the process, as illustrated by FIGS. 10A and 10B.

Figure 6:
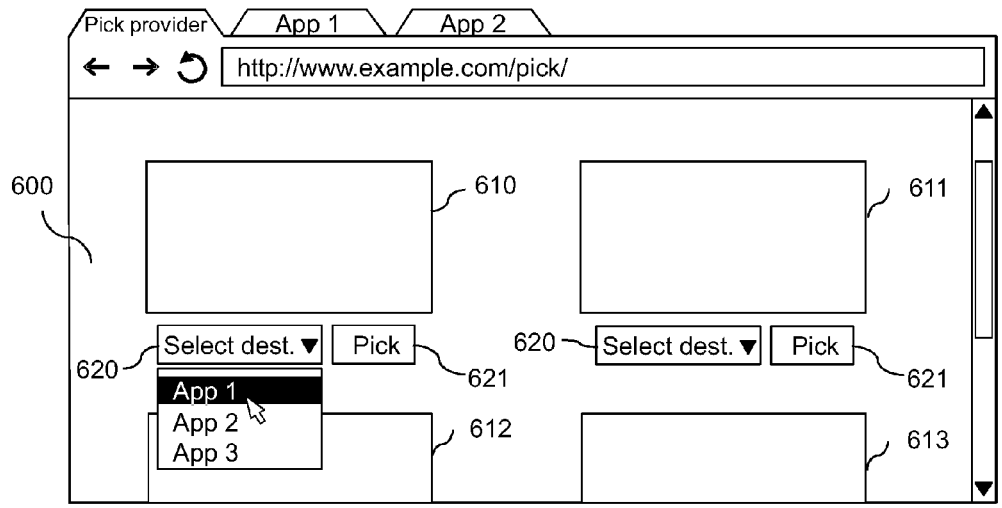
FIGS. 6 and 7 show examples on how the providing of a data object and the selecting of a destination application may be performed in the context of an application adapted to provide data objects of image type and run in a web browser.
Figure 7:
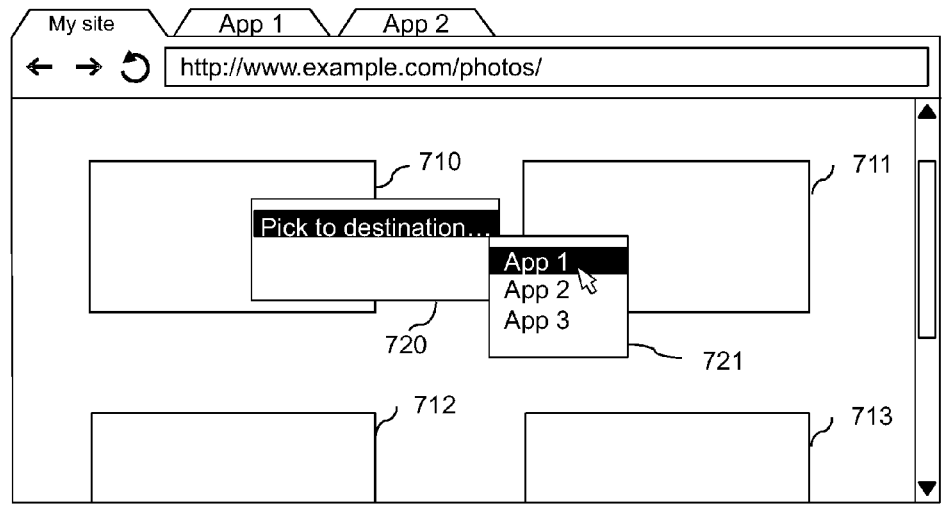

FIGS. 6 and 7 show examples on how the steps of providing a data object and selecting a destination application described in FIG. 5 may be performed in the context of an application adapted to provide data objects of image type and run in a web browser.

In FIG. 6, it is assumed that the service provider application is designed to provide images ("Pick" provider application).

An application designed to provide a predetermined type of data object is an application that declares itself as a provider for this type of data object. This may be performed by inserting a specific tag in the code of the application specifying the service to be provided and the type of the resulting data object. Thus, application 600 declares itself as providing a "Pick" service and data objects of image type. It is to be noted that the provided data objects can be of complex type combining for example image and text, the latter being used to communicate the title or other meta-data along the image in one data object. Also, the data object may include a plurality of images.

As illustrated, the provider application 600 is loaded from an URL "http://www.example.com/pick/" and executed. During the executing, a plurality of images 610, 611, 612 and 613 are displayed. Considering that application 600 is designed to provide images, an appropriate user interface component 621 is displayed for selecting the image to be provided. A further user interface component 620 is also provided to enable the selection of the one or more destination applications to which the image is to be communicated. A list of destination applications "App 1", "App 2" and "App 3" capable of receiving images are displayed via a menu so that the user can select among them. In the example, "App 1" and "App 2" are applications already loaded by the WRE (as indicated by tabs of these two applications open on the background), whereas "App 3" is either considered to be operating outside the WRE, or is not yet loaded by the WRE. In this latter case, the destination application is assumed to be known to the WRE (e.g. logged in a history file following a prior use by the WRE) where it is only loaded after selection.

The display and handling of user interface component 620 may be at the initiative of the provider application if the WRE provides a means for said provider application to determine that it has to display this interface (e.g. via a JavaScript property). Alternatively, the WRE may directly insert user interface components 620 in said provider application interface (or in another part of the user interface). The position where the user interface component 620 is inserted, for instance next to each "Pick" button, can be determined by the WRE by inspecting the source code of the provider application.

The user interface of FIG. 6 is only one illustration and many variations may exist. In the illustrated example, two user actions are necessary to both determine the image (data object) to be provided and to select the destination application (s) since a selection menu 620 and a service selection button 621 are associated with each image. Alternatively, a tick box can be associated with each image for determining images to be provided and only one selection menu and one service selection button can be displayed to select the destination application(s) and providing the objects. This variant enables to provide a data object comprising a plurality of images.

FIG. 7 depicts an example of an application enabled to provide images (thus "Pick" service) by the WRE, although not designed for that, i.e. not embedding the necessary code for enabling the selecting of an image and providing it to the WRE.

As illustrated, the provider application 700 is loaded from an URL "http://www.example.com/photos/" and executed. During the executing, a plurality of images 710, 711, 712 and 713 are displayed. Because the application is not originally designed to provide images, the WRE supplements the user interface by dedicated menus 720 and 721 for selecting an image and a destination application. These menus can be displayed by the user by pointing to the desired image and right-clicking a mouse button for performing the selections.

Figure 8:
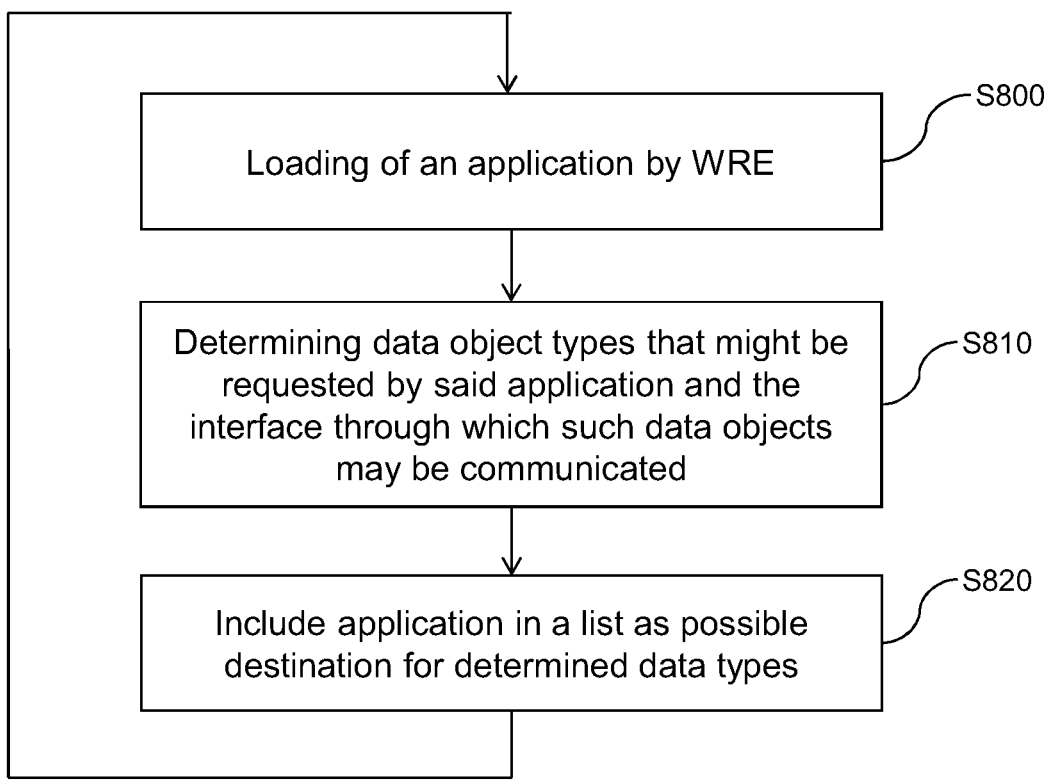
FIG. 8 is a flowchart describing an implementation example on how a list of one or more service requester applications is obtained by the web runtime environment.

FIG. 8 is a flowchart describing an implementation example on how a list of one or more service requester applications is obtained by the web runtime environment. This corresponds to step S520 of FIG. 5.

First, at step S800, an application is loaded by web runtime environment. Then at step S810, the types of data object that might be requested by said application, as well as the interface through which such data objects may be communicated, are determined by the web runtime environment.

Determination at step S810 can be performed by code inspection while loading the application or afterward as a dedicated process in order not to slow down application loading. By referring to FIG. 4A (or 4C), it can be easily determined from field 404a which service is requested in the service request (kind of Intent object), e.g. "Share", "Pick", "Edit", "View", and from field 405a, the type of the associated payload data (image, video, music, . . . ). Based on these information, the type of requested data object may be determined.

For certain services, like the "Pick" service, the type of the data object that is expected from a service request corresponds simply to the type of the payload data contained in the request.

For other services, like the "Edit" service, the type of the returned data object is usually the same as the type of the payload data, and thus field 405a provides the information.

More generally, the type of the returned object is known from the specification of the considered service. Indeed, when a service requester application initiates a service request, it should be aware of the type of the object returned in response to that service request. The WRE may then use the specification of the service as basis for determining the type of returned data objects and thus the type of data objects that the service requester application is adapted to accept.

Also, the call-back methods 407a and 408a define the necessary interface for providing a data object in return as described earlier.

It is to be noted that not all services are equally useful for obtaining a list of service requester applications, and the web runtime environment may purposely consider only a limited number of acceptable services for forming the list. For instance, "View" service is used by a requester application that wants a user to view a resource in another application (for instance, user may want to view a video in an application providing specific video features). An application relying on "View" service does not expect payload data in the resulting data object, but rather whether or not the data to be viewed was correctly handled by the View provider, for instance as a string value (status information). Consequently, even though an interface for receiving a string value is defined, there is little interest in retaining this application as a possible destination application for string values because said application does not expect an arbitrary string value, but a string value that is the result of a "View" request.

A service of a particular interest for implementing embodiments of the present invention is the "Pick" service. "Pick" service consists in requesting a provider application to provide a data object of a given type. Therefore, any application that relies on a "Pick" service implicitly expresses a need for the given type of data and provides an interface through which such data can be communicated to it.

At step S820, if the application is retained, it is included in a list as possible destination for the determined data types. The flowchart then continues by loading other applications, if any.

To store possible destination applications for a given type of data object, as well as the corresponding interfaces, Web runtime environment may for instance maintain a table associating types of data objects to possible destination applications. For each possible destination, properties such as its name, its location (typically, a URL) and its interface for handling the considered type of data object are saved.

Additionally, parameters supported by said destination (service requester) application and involved in the handling of the considered type of data object may also be saved. As an example, an application defining an interface for receiving images may support optional parameters such as a title and a file name. Then, the fact that title and file name can be provided to the application may advantageously be saved by Web runtime environment.

Alternatively to a service requester application that implements a unique interface for receiving a data object as depicted in FIGS. 4A and 4C, a service requester application may include two distinct interfaces, a first one for receiving a data object the requester application expects to receive following the generation of a service request, and a second one for receiving data objects not resulting directly from the generation of a service request and thus not expected.

For instance, if an application requests an image through "Pick" service, it may specify that the provided image should be handled by a method "handleImage( )", whereas if an image is received without having been requested, the application may specify that the method that should be used is "handleImageNotRequested( )" instead of "handleImage( )". Indeed, an application may want to distinguish the processing in these two different contexts.

As a first example, this may be useful for a photo editing application relying on "Pick" service. Indeed, when a new photo is obtained without having been requested, said application may ask user whether current data (e.g. another photo being edited) should be saved prior to the loading of the newly obtained photo. The process may be different when the user requests a new photo directly from said application: prior to creating corresponding service request, application can ask user whether current data should be saved. Therefore, the difference between the two cases is that in the first case, user is asked for saving prior to loading obtained photo, whereas in the second case, user is asked for saving prior to creating a service request. The definition of two different functions such as "handleImage( )" and "handleImageNotRequested( )" enables these two different behaviors.

As a second example, if an application relies on "Edit" service for editing images, said application defines an interface for receiving images. When an image is returned by a selected "Edit" service, the edited version of the image may replace the initial version in user interface (to do so, the initial version is typically removed, and the newly obtained image added in place of said initial version). However, if embodiments of the invention are applied, said application may receive an image without having created any service request. Therefore, the obtained image may not replace an initial version, and application does not have, for instance, to remove an initial version and to replace it by the newly obtained image. Consequently, the definition of another interface, such as a function "handleImageNotRequested( )", would be beneficial as it would enable to perform a specific processing for images not requested, for instance not removing an initial image prior to add them in user interface, contrary to the case where an image is obtained through "handleImage".

Finally, as a third example, a photo album application may enable user to have two photos per page. A possible implementation consists in having one "Pick" button for each of the two photos of a given page, each button being associated to a different call-back for handling the obtained photo (e.g. "handlePhotoTop( )" and "handlePhotoBottom( )"). Using the invention, WRE can identify these two different call-back functions and allow user to select one of them (e.g. through labels such as "Photo album—Top" and "Photo album—Bottom"), but this may be confusing for user. On the other hand, if a specific function "handlePhotoNotRequested( )" is defined, WRE can rely on this method to provide said application with a photo not requested. Upon the receiving of such photo, photo album application would start by asking user whether the newly obtained photo should be placed at the top or at the bottom of the page.

In order to enable any application run by operating system 110 to be a potential destination application, web runtime environment may provide an interface for that application so that it can register itself as being interested in certain types of data objects. By doing so, a user may for instance be able to communicate, from a service provider application run by web environment application, and through the web runtime controller, an image to an image editor run by the operating system.

Figure 9:
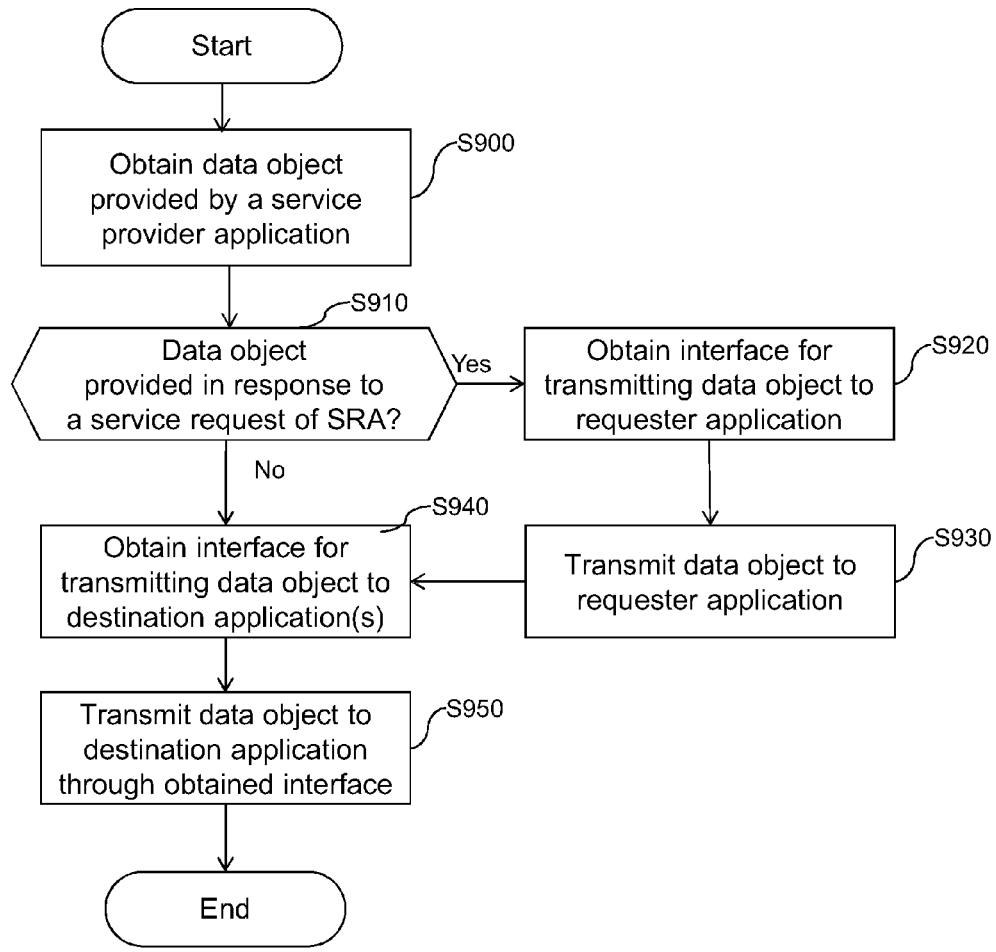
FIG. 9 is a flowchart that describes the communication of a data object to the selected one or more destination applications when a data object is provided in response to a service request generated by a (distinct) service requester application.

FIG. 9 is a flowchart that describes the communication of a data object to the selected one or more destination applications when a data object is provided in response to a service request generated by a (distinct) service requester application. This flowchart is performed by the web runtime controller 340.

This process starts at step S900 by obtaining a data object provided by the service provider application and intended to be communicated to one or more destination applications. At step S910, a test is performed to determine whether the data object has been provided in response to a service request generated by a service requester application. If the test is positive, the interface for transmitting the data object to the requester application is obtained at step S920. This interface is known by the web runtime controller since it should have been specified by the requester application when it sent its service request. The data object is then transmitted to the requester application through the obtained interface at step S930.

If the data object has not been provided in response to a service request generated by a service requester application (test S910 negative), or following step S930, the interface for transmitting the data object to each destination application is obtained at step S940. This interface is obtained by the web runtime controller for example by executing of the flowchart of FIG. 8. At step S950, the determined data object can then be communicated to each destination application using the obtained interface.

In a variant implementation, step S930 may be replaced by the communication of a result different from the provided data object, for instance a data object without payload data but containing a status information indicating that data has been directed to a different destination application. The advantage of this variant is that only one application receives the payload data from the provided data object, which makes interaction with the user more intuitive. For this variant the service requester application should however be compliant with the possibility of not receiving payload data, this avoids unpredictable behavior occurring at the application.

In a further implementation variant, steps S910, S920 and S930 are removed, and the steps S900, S940 and S950 are executed in sequence. In this implementation variant, nothing is transmitted to the service requester application, which is simpler. The absence of a data object might be considered as a failure in providing the service by certain applications. More generally however, how the application reacts to this absence is implementation dependent and may not cause issues for certain other applications.

Furthermore, in order to minimize interference with the behavior of a service requester application when a data object is to be communicated, the WRE may decide to load a new instance of the application instead of using an already loaded instance as destination. This is particularly recommended for example when the application doesn't have the ability of handling the reception of multiple data objects. Thus, if the application has already initiated a service request for which it is still awaiting a response or when it has already received a first response data object, a new instance of the application is preferably loaded. The ability of handling multiple data objects may be known from specific declarations present in the code of the application.

Additionally, even if an already loaded instance of a selected destination application has the ability to handle multiple returned data objects, the web runtime environment may provide the user with the possibility of loading a new instance of the application.

Under certain circumstances, the WRE may even force the loading of a new instance such as for example when the service requester application has previously generated a service request towards another service provider application and only data objects provided from that another provider application are allowed to be received.

In view of code inspection as described with reference to FIG. 8 (or for the case above of determining the ability of handling multiple data objects), destination application(s) can be loaded right before executing step S940. In the general case however, one destination application may already have been loaded in the web runtime environment at the time of inspecting its code in view of communicating to it a data object. The loading might have been performed because the application has been involved in a previous generation of a service request.

FIG. 10A illustrates a scenario in which the communication of a data object to a service requester application is performed without the service requester application having generated a service request towards the service provider application that provided the data object.

First, user loads a Photo Album application 10 in a web browser. In order to add photos to the photo album, the user can use a "Pick" button provided by the Photo Album application. "Pick" button generates a service request 12 for action "Pick". The type of payload data requested is image.

Web browser displays a list of possible provider applications for action "Pick" and type "image". User selects one of them, which is then loaded by the web browser. The loaded Pick application is illustrated by reference 20.

Through the graphical user interface provided by the Pick application, the user identifies a photo he/she wants to add to the photo album, but say, he/she wants to edit it before because the photo album doesn't provide edition capabilities. The Pick application on its side doesn't provide edition capabilities neither, but it is capable of acting as a requester for the edit service from an Edit provider application 30. The Pick application includes for that an "Edit" button to generate an edit service request 23 for the selected photo. After the button is pressed by the user, the photo is transmitted in the service request and is opened in the edit provider application 30. After edition is finished, user presses on a "complete" button.

After "complete" button is pressed, the edit provider application has to return a data object including the edited image. According to embodiments of the invention, instead of returning the edited photo to the Pick application, a menu is displayed providing the user with the possibility to select a requester application (corresponding to step S530 of FIG. 5). The selection may be performed among a list of two requester applications comprising the Pick application and the Photo Album application since both these two applications are adapted to receive image type payload data. Of course, the list is not necessary limited to these two applications and it may include other applications, even not already loaded by the web browser provided that they accept image type payload data. The user can then select the Photo album application for directly returning the data object 31 including the edited photo.

Alternatively, the "complete" button in the Edit provider application 30 is replaced by an interface that enables the user to select the destination application. This may for instance be a button that displays a pre-selected destination application.

In this example, web browser may predict, based on previous user actions, that the final destination of edited photo is likely to be the Photo Album application. Photo Album application would therefore be displayed as the pre-selected destination application, and when user would click on "Complete" button, the photo would be transmitted to the Photo Album application in data object 31.

As a result, user is able to perform operations more intuitively over the user interface. Furthermore, less steps are necessary compared to the case where the edited photo is first returned to the Pick application and then from the Pick application to the Photo Album application (3 steps instead of 4).

As described with reference to FIG. 9, the edited photo may be communicated to the Pick application which made the edit service request in addition to the Photo Album. This multiple communication is preferable if the Pick application doesn't support void data objects to be returned or data objects containing only status information.

FIG. 10B illustrates a scenario in which the communication of a data object to a service requester application is performed without the service requester application having generated a service request.

In this scenario, a user first loads a Pick provider application 50 in a web browser implementing the invention (cf. example of FIG. 6). Means are provided to the user to select a photo and service requester application according to the different embodiments of the invention. In this context we assume that only a Photo album application 40 is available and is displayed in the list. After selection of the Photo album application 40, a data object 54 including the selected photo is communicated to the Photo album.

Although similar result may be obtained compared to a scenario where the user performs a pick service request from the Photo album requester application, invention offers more flexibility for the user to perform actions from any application he/she is operating with and leads to faster execution times because fewer steps are involved.

The invention claimed is:

1. A method for controlling communication between a service provider application and one or more service requester applications in a web runtime environment of a processing device, the web runtime environment, the one or more service requester applications, and the service provider application being run by the processing device, the web runtime environment being run at a client side, the method comprising the following steps run by the web runtime environment in the following order:

executing code of a service provider application thereby providing a data object of a given type;

after the executing step, obtaining a list of one or more service requester applications, each service requester application being adapted to generate a service request and implementing an interface for receiving a data object in response to the generated service request;

after the obtaining step, enabling the selection, among the obtained list, of one or more requester applications adapted to receive data objects of the same type as the given type of the provided data object; and communicating the provided data object to the selected one or more requester applications via its or their corresponding interface.

2. The method of claim 1 wherein the communicating of the data object to the service requester application is performed without the service requester application having generated a service request.

3. The method of claim 1 wherein the communicating of the data object to the service requester application is performed without the service requester application having generated a service request towards the service provider application providing the data object.

4. A method according to claim 1, wherein the providing of the data object by the service provider application is caused by the reception, via the web runtime environment, of a service request from a service requester application distinct from the one or more selected service requester applications.

5. The method of claim 4, further comprising notifying status information to the service requester application that is distinct from the one or more selected service requester applications, the status information comprising indication that the service request has been processed.

6. A method according to claim 1, further comprising parsing the code of the service requester application(s) of the obtained list for determining the type of data objects said service requester application(s) are adapted to receive and the corresponding interface(s) via which the data object can be communicated.

7. A method according to claim 1, further comprising, prior communicating the provided data object, parsing the code of the selected service requester application for checking that the corresponding interface via which the data object can be communicated is still valid.

8. A method according to claim 1, wherein enabling the selection of one or more requester applications comprises displaying a user interface component by the web runtime environment making it possible for a user to select the one or more requester applications.

9. A method according to claim 1, wherein the web runtime environment is a web browser.

10. A method according to claim 9, wherein the code of the service provider application is downloaded from a web server.

11. A method for controlling communication between applications in a web runtime environment according to claim 1:
   wherein the one or more service requester applications are adapted to generate a service request and implementing a first interface for receiving a data object in response to the generated service request and a second interface for receiving data objects not in response to generated service requests; and
   wherein communicating the provided data object to the selected one or more service requester applications is performed using the second interface.

12. A processing device adapted to run a web runtime environment for controlling communication between a service provider application and one or more service requester applications, the web runtime environment, the one or more service requester applications, and the service provider application being run by the processing device, the web runtime environment being run at a client side, comprising:
   means for executing code of a service provider application thereby providing a data object of a given type;
   means for obtaining a list of one or more service requester applications, each service requester application being adapted to generate a service request towards a service provider application and implementing an interface for receiving a data object in response to the generated service request;
   means for enabling the selection, among the obtained list, of one or more service requester applications adapted to receive data objects of the same type as the given type of the provided data object; and
   means for communicating the provided data object to the selected one or more requester applications via its or their corresponding interface.

13. A non-transitory computer-readable storage medium storing instructions of for causing a processing device to:
   execute code of a service provider application by a web runtime environment run at a client side thereby providing a data object of a type of a given type;
   after executing code of a service provider, obtain a list of one or more service requester applications, each service requester application being adapted to generate a service request towards a service provider application and implement an interface for receiving a data object of the same type as the provided data object in response to the generated service request;
   after obtaining a list of one or more service requester applications, enable the selection, among the obtained list, of one or more service requester applications adapted to receive data objects of the same type as the given type of the provided data object; and
   communicate the provided data object to the selected one or more requester applications via or its their corresponding interface.

* * * * *